US007146481B2

United States Patent
Krehbiel, Jr. et al.

(10) Patent No.: US 7,146,481 B2
(45) Date of Patent: Dec. 5, 2006

(54) METHODS AND SYSTEMS FOR PRE-MERGE READ OF CONFIGURATION DATA FROM A FOREIGN VOLUME GROUP INSERTED IN STORAGE ARRAY

(75) Inventors: Stanley Krehbiel, Jr., Wichita, KS (US); William Hetrick, Wichita, KS (US); Joseph Moore, Wichita, KS (US); William Delaney, Wichita, KS (US); Carey Lewis, Wichita, KS (US); Scott Hubbard, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 550 days.

(21) Appl. No.: 10/395,512

(22) Filed: Mar. 24, 2003

(65) Prior Publication Data

US 2004/0193797 A1  Sep. 30, 2004

(51) Int. Cl.
*G06F 12/02* (2006.01)
(52) U.S. Cl. .................. 711/170; 711/114; 711/148
(58) Field of Classification Search ................ 711/114, 711/170, 147–148
See application file for complete search history.

(56) References Cited

U.S. PATENT DOCUMENTS 6,311,232 B1 * 10/2001 Cagle et al. .................. 710/8
2004/0003157 A1 * 1/2004 Lee .......................... 710/302

* cited by examiner

*Primary Examiner*—Matthew Kim
*Assistant Examiner*—Hetul Patel
(74) *Attorney, Agent, or Firm*—Duft, Bornsen & Fishman

(57) ABSTRACT

Methods and structure for storing volume and other configuration information on all disk drives of a volume group and for performing pre-merge operations to inform a user of the pending availability of the identified volumes. Configuration information has been historically stored in two distinct areas of configuration information on disk drives—a volume information area and an "other" information area. Aspects of the invention provide for storing all configuration information in the "other" information area. All disks of a system therefore include all configuration information relating both to volumes and to pseudo volume. A pre-merge operation is performed when each disk drive is inserted into a storage system to present new volume information to a user. When the last disk drive of a volume group is inserted, the user may select new volumes to be imported into the system.

20 Claims, 4 Drawing Sheets

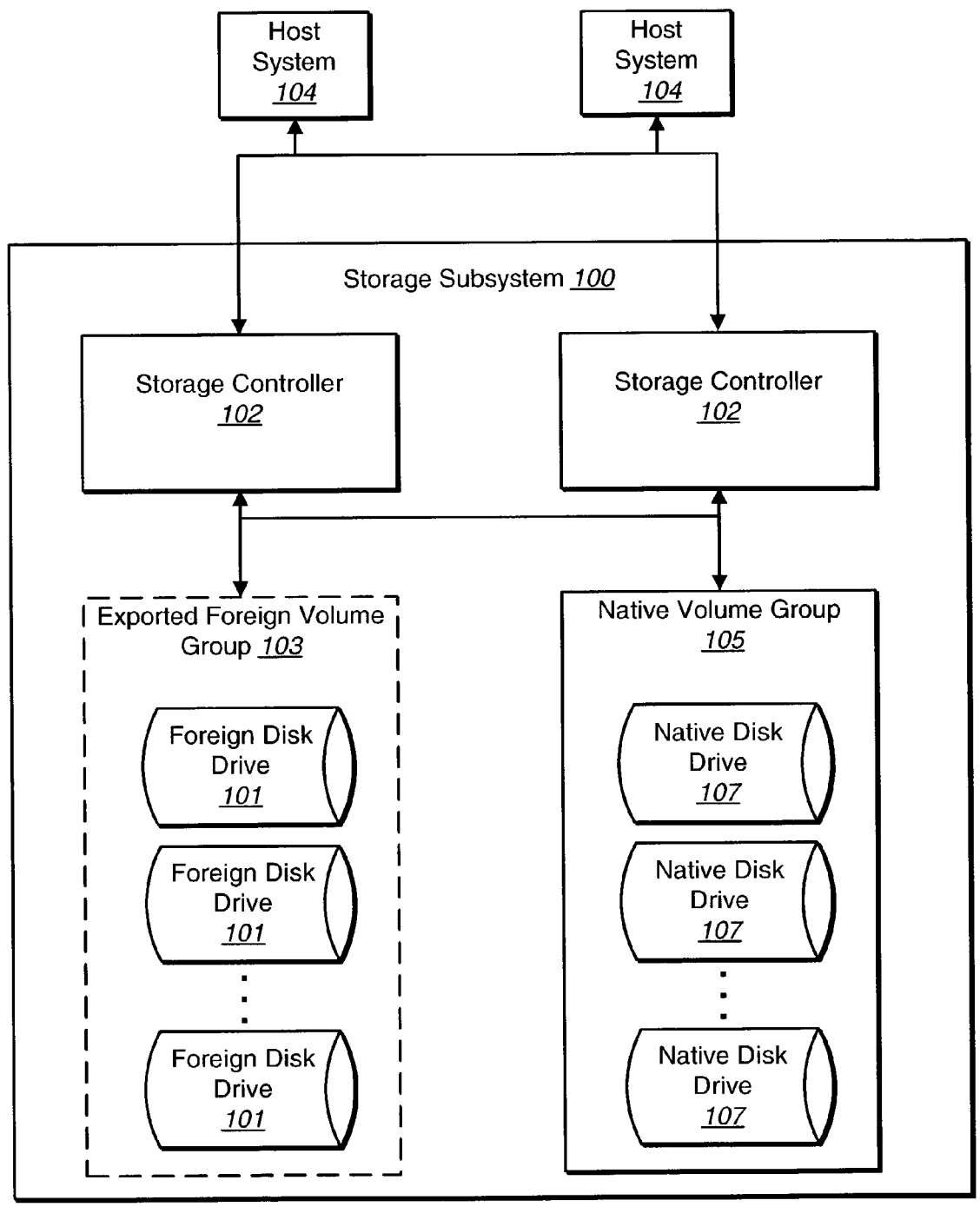
FIG._1

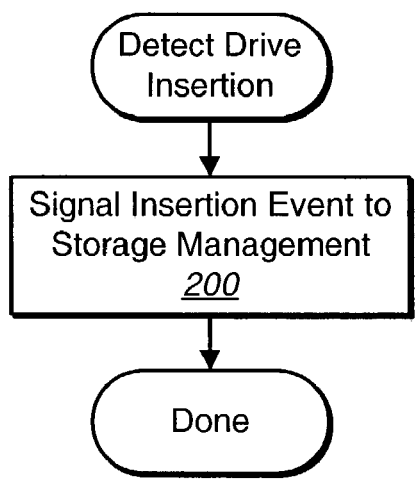
FIG._2
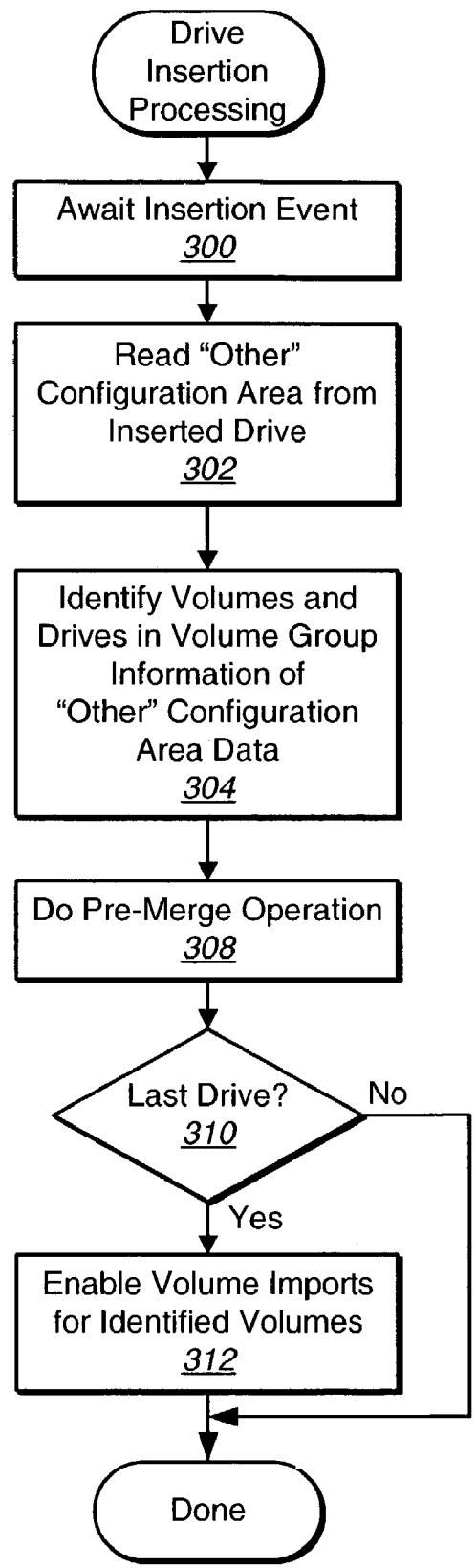
FIG._3

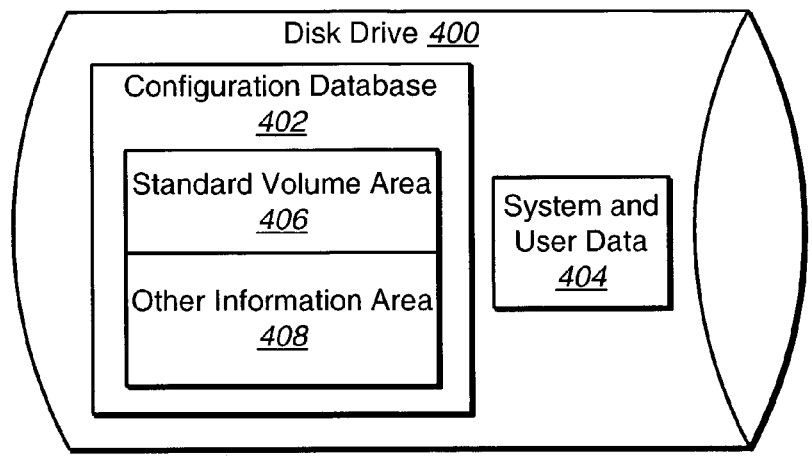
FIG._4
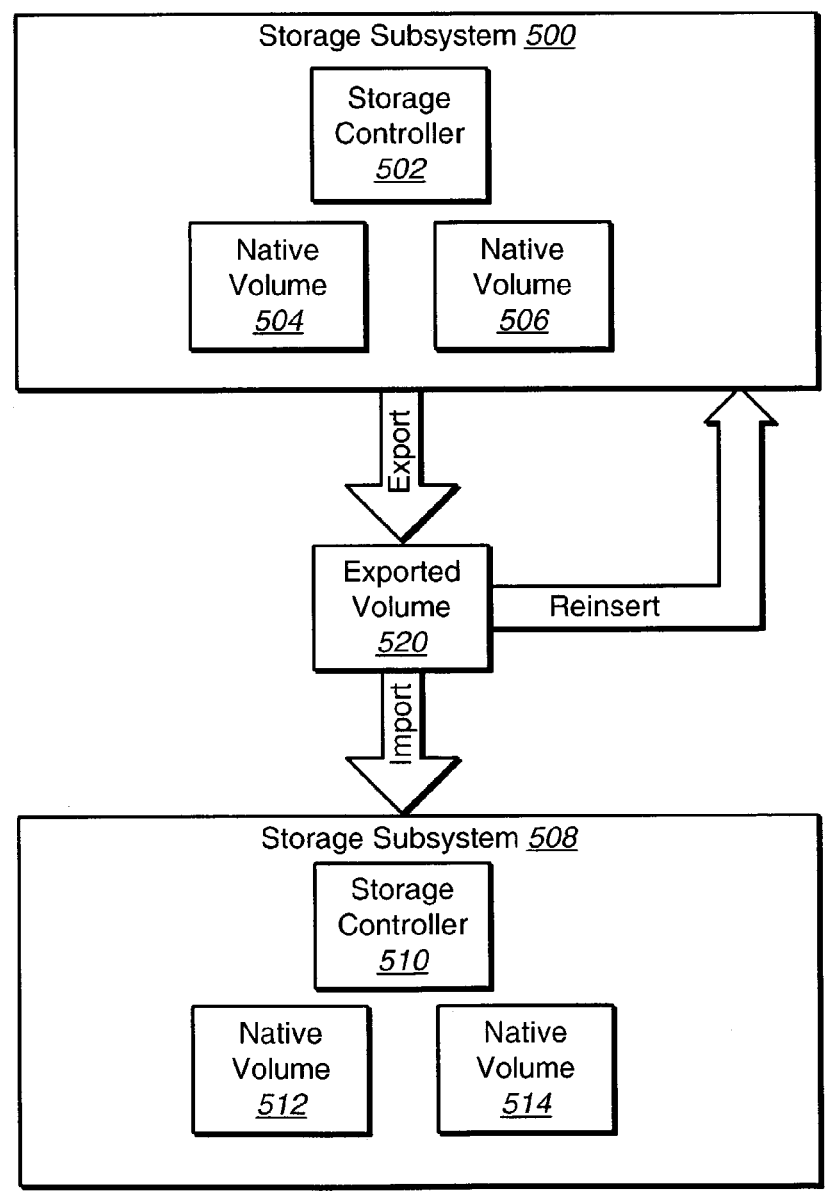
FIG._5

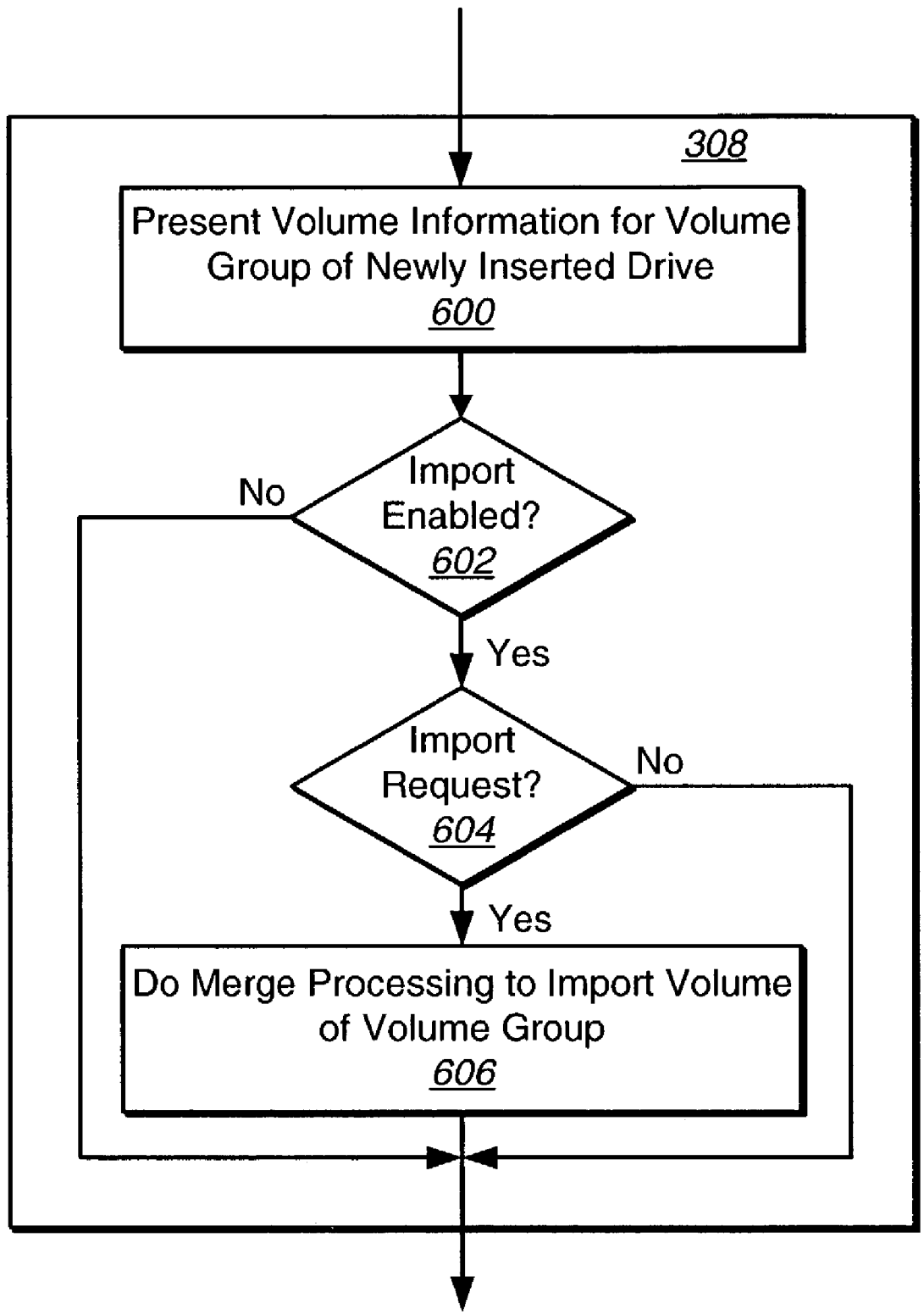
FIG._6

METHODS AND SYSTEMS FOR PRE-MERGE READ OF CONFIGURATION DATA FROM A FOREIGN VOLUME GROUP INSERTED IN STORAGE ARRAY

RELATED PATENTS

This patent application is related to commonly owned U.S. Pat. application Ser. No. 10/395,558 entitled METHODS AND STRUCTURE FOR IMPROVED VOLUME MIGRATION BETWEEN STORAGE ARRAY SUBSYSTEMS, filed Mar. 24, 2003, issued Mar. 7, 2006 as U.S. Pat. No. 7,010,646 and hereby incorporated by reference and hereinafter referred to as the "sibling" patent application.

BACKGROUND OF THE INVENTION

1. Field of the Invention

The invention relates generally to storage subsystems and more specifically relates to pre-merge operations performed in response to insertion of disk drives of a foreign volume group into storage array.

2. Discussion of Related Art

Computer systems use storage devices for storage and retrieval of data as well as programs. As computing applications have evolved, so to have demands on storage devices for increased capacity, speed and reliability. Storage devices have evolved from simple single disk devices to complex subsystems with substantial local control capabilities for extensive local management of storage.

Present day storage subsystems may incorporate local management capabilities for improved performance as well as enhanced reliability. Storage management techniques for enhanced performance may include features such as striping to distribute data over multiple individual disk drives in the subsystem so that any particular I/O operation may be completed by using multiple disk drives operating in parallel. Other storage management techniques, so-called RAID storage management, enhance reliability of storage subsystem by including redundancy information to permit ongoing operations of the storage subsystem despite loss of one or more of the individual disk drives.

Such high-performance, high reliability storage subsystems often subdivide or partition the total storage capacity of the subsystem into logical groupings referred to as volumes or logical units ("LUNs"). Each such volume may comprise a portion of the total capacity of the storage subsystem including some portion of one or more of a plurality of disk drives within the storage subsystem. Further, each disk drive within the storage subsystem may have portions of its individual capacity allocated to zero or more such volumes. A volume group is a collection of one or more disk drives on which one or more volumes are defined. No volume in a volume group can span any other volume group.

Each volume of such a storage subsystem is generally presented to attached host systems as a single high capacity, high-performance, high reliability storage device. Hidden from the host system is the "geometry" of the volume—the distribution of data over multiple disk drives and use of redundancy information. In other words, local control processing capabilities within the storage subsystem provide mapping of logical storage locations into corresponding physical locations on the individual disk drives and provide for generation and verification of redundancy information.

Each storage subsystem may provide one or more volumes of storage for a host system or a plurality of networked computing devices. Some volumes may be configured to optimize for performance while other volumes may be optimized for reliability depending upon the needs of particular computing applications. System administrators for such complex storage applications utilize tools to help configure the multiplicity of volumes associated with such complex storage applications. As particular applications within the administrator's enterprise increase or decrease their need for storage, the system administrator may dynamically reconfigure various aspects of the storage subsystems. Such reconfiguration may include, for example, migrating an entire volume physically from one array storage subsystem to another array storage subsystem. Such migration may be useful to provide added capacity for a particular computing applications associated with a particular storage subsystem where excess capacity is available in another storage subsystem.

In many present day computing and storage applications, a volume group may be removed from a storage system and inserted in another storage system (or reinserted in the same storage system). Sometimes a volume group may be removed from a first storage system and migrated to another system where the volume group is then inserted. In certain high security applications, a volume group may be removed from a storage system to secure it from unauthorized access and then reinserted when security concerns so permit.

In general, as presently known in the art, configuration information is stored on the disk drives of a volume group. The configuration information may indicate the storage array subsystem in which the volume is presently operating. Within that identified storage subsystem, the volume and disk drives are referred to as "native". The same information relative to other storage array subsystems defines the disk drives and volume as "foreign" with respect to such other storage array subsystems. When individual disk drives or an entire volume group are inserted into a storage subsystem, the controller(s) of that storage subsystem reads the configuration information from the disk drives and determine if the individual disk drive is native or foreign with respect to that storage array subsystem. Similarly, if all disk drives of a volume group are inserted into a system, the volume group may be identified as foreign or native to that storage system.

The information read from the disk drives also includes information regarding the volumes in which each disk drive was a member. When the controller of the storage array reads the configuration information from the disk drive and determines that disk drive is foreign with respect to that storage array subsystem, the user may be prompted to indicate whether the volume or volumes associated with this drive are to be "imported" into the storage array.

The configuration data indicating volumes associated with the drive or volume group is generally saved in an area referred to herein as the volume data area. In some storage array systems, configuration information stored on the disk drives is arranged in at least two distinct areas-a volume data area and an "other" data area. In general, such a division of configuration information derives from the evolution of storage subsystems. The other data area includes, for example, information pertaining to atypical storage volumes or partitions. Exemplary of such atypical storage volumes or partitions are: so-called pseudo volumes. Such pseudo volumes may include, for example, remote volumes physically resident outside the confines of any particular storage system and snapshot volumes representing snapshot copies of other volumes often used in backup procedures. Configuration and utilization of such pseudo volumes has evolved over time as add-on features or extensions to existing storage subsystem control logic and features. A natural progression in such evolution tended to relocate such extension or enhancement data in the other data area associated with configuration information on disk drives.

Problems have arisen due to the subdivision of configuration data into two or more data areas as discussed above. A first problem arises in that the other data area has historically not been duplicated on all disks of the array storage subsystem. This incurs the detriment of a lower level of redundancy as regards such other configuration information. The reduced redundancy of the other configuration information may give rise to reliability problems relating to the associated configuration information.

A second problem relating to the subdivision of such configuration information into two or more data areas relates to operations to merge such configuration information with existing configuration information in a storage subsystem. In general, when a new volume group is inserted into an array storage subsystem, the volumes defined in the configuration information on the disks are merged with other volume information already known to the system. Since the configuration information has historically been subdivided into two or more data areas, the merging operation with respect to the two distinct areas cannot be assured to occur as an atomic, uninterruptible operation. This complicates recovery procedures where, for example, power is lost during the merge operations.

It is evident from the above discussion that a need exists for improved merging of information where configuration information includes distinct portions relating to volume information and relating to other configuration information.

SUMMARY OF THE INVENTION

The present invention solves the above and other problems, thereby advancing the state of the useful arts, by providing methods and associated systems to perform the merge operations and to store all configuration area data in a single data area of the disk drives. More specifically, all configuration information may be stored in the so-called other data area of the configuration information. Insertion of a first disk drive of a volume group may initiate a pre-merge operation by gathering all required information associated with volumes and pseudo volumes of the volume group being inserted. The data so gathered in the pre-merge operation may be presented to the user in advance of insertion of the last drive of a new volume group. Although the pre-merge information may be presented to a user, the user may be precluded from selecting importation of volumes in the newly inserted volume group until all drives of the volume group are inserted into the array storage subsystem.

One feature of the invention provides systems and a method for storage management comprising: detecting insertion of a disk drive of a volume group in an array storage subsystem; reading all configuration information from a configuration information area on the disk drive; performing a pre-merge operation to present the configuration information to a user; and allowing importation of volumes identified in the configuration information in response to detecting insertion of the last disk drive of the volume group associated with the disk drive.

Another aspect of the invention further provides that the step of reading includes: reading configuration information regarding a volume group associated with the disk drive; reading configuration information regarding volumes associated with the volume group; and reading configuration information regarding pseudo volumes, such that all configuration information is read as an atomic operation.

Another aspect of the invention further provides for receiving input from a user requesting import of volumes identified in the configuration information; and importing the identified volumes into the array storage system.

Another aspect of the invention further provides that the step of importing includes: merging the configuration information with other configuration information previously known to the array storage system.

Another aspect of the invention further provides for receiving input from a user requesting import of all volumes of a volume group identified in the configuration information; and importing the identified volumes into the array storage system.

Another aspect of the invention further provides that the step of importing includes: merging the configuration information with other configuration information previously known to the array storage system.

Another aspect of the invention further provides for registering a listener client process to await receipt of an event indicating the detection of insertion of a disk drive; and signaling a disk insertion event to all registered listener client processes in response to the detection of insertion of a disk drive.

BRIEF DESCRIPTION OF THE DRAWINGS

FIG. 1 is a block diagram of a storage subsystem embodying features of the present invention.

FIG. 2 is a flowchart of a method associated with aspects of the present invention.

FIG. 3 is a flowchart of a method associated with aspects of the present invention.

FIG. 4 is a block diagram depicting an exemplary disk drive including configuration database information useful in an embodiment of the present invention.

FIG. 5 is a flowchart describing and exemplary volume import method of the present invention.

FIG. 6 is a flowchart of a method associated with aspects of the present invention.

DETAILED DESCRIPTION OF THE DRAWINGS

FIG. 1 is a block diagram showing a storage subsystem 100 embodying features of the present invention for importing disk drives or volumes based on information available on all drives of a volume group. Storage subsystem 100 may include one or more storage controllers 102 coupled to one or more host systems 104 via communication path 150. Those of ordinary skill in the art will readily recognize that storage subsystem 100 may include any number of storage controllers 102. As shown in FIG. 1, it is common for high-performance, high reliability storage subsystems to include at least two storage controllers 102. Duplicate storage controllers 102 provide redundancy in case of failure of one storage controller and may provide performance enhancements through parallel usage of the multiple controllers when not relied upon for redundancy. Further, those of ordinary skill in the art will readily recognize that communication path 150 may be any of several well-known communication media and protocols including, for example, parallel SCSI, Fibre Channel, Ethernet, and numerous other well-known storage communication media and protocols. Still further, those of ordinary skill in the art will recognize that many such communication media and protocol permit a storage subsystem 100 to communicate with multiple host systems as shown in FIG. 1. Any number of such host systems may be present and in communication with a storage subsystem 100.

Storage controllers 102 of storage subsystem 100 receive and process I/O requests from host systems 104. Host requests are processed by appropriate lower-level I/O operations to store and retrieve information on one or more storage volumes associated with the storage subsystem 100. As used herein, "volume" represents a logical partition of storage space in a storage subsystem 100. In general, a storage subsystem 100 includes one or more disk drives (i.e., disk drives 101 and disk drives 103) each capable of storing and retrieving information. A volume may comprise a portion of one or more such disk drives within a storage subsystem. Often, a volume may include the entire capacity of each of multiple disk drives within the storage subsystem. Therefore, as used herein, "volume" may refer to a portion of a single disk drive or portions of each of multiple disk drives in the storage subsystem. The portion of each disk drive may be any portion up to the entire capacity of the disk drive minus any reserved portions for configuration information as discussed below.

As shown in FIG. 1, foreign volume 103 comprises one or more foreign disk drives 101 and native volume 105 comprises one or more native drives 107. Those of ordinary skill in the art will readily recognize that any number of disk drives and/or portions of disk drives may be configured within a single volume. Further, any number of volumes may be configured within storage subsystem. Still further, those of ordinary skill in the art will recognize that disk drives 101 and disk drives 107 may be any type of storage element including, rotating magnetic or optical disk drives, fixed head rotating magnetic or optical disk drives, solid state disk drives (i.e., so-called RAM disks), or any other storage elements capable of storing and retrieving information.

Storage controllers 102 communicate with storage volumes 103 and 105 via communication path 152. Those of ordinary skill in the art will readily recognize that communication path 152 may be any of several well-known communication media and protocols useful in communicating between storage controllers and storage elements. Such communication media and protocols may include, for example, parallel SCSI, Fibre Channel, Storage Area Network ("SAN") architecture communications such as Infiniband and other well-known communication media and protocols.

Those of ordinary skill in the art will recognize that any number of redundant and/or parallel communication paths may be used in communicating between host systems 104 and storage controllers 102 as well as between storage controllers 102 and storage volumes 103 and 105. Such duplicate or redundant communication paths provide enhanced reliability in that redundant paths may be relied upon where the first path fails. Further, such duplicate paths may be used to enhance performance by providing multiple parallel channels of communication between host systems 104 and storage controllers 102 as well as between storage controllers 102 and storage volumes 103 and 105. Such redundancy enhancements and parallel performance enhancements are generally known to those of ordinary skill in the art.

As shown in FIG. 1, storage volume 103 is a foreign volume available for import into storage subsystem 100. Such importation of a volume may be related to insertion of a volume group not previously known to the storage subsystem. In addition, as discussed in the sibling patent application, importation may be related to reinsertion of a volume temporarily removed from the subsystem in which it previously resided. FIG. 5 shows a schematic diagram depicting import, export and reinsertion of a storage volume. Storage subsystem 500 may include storage controller 502 and native volumes 504 and 506. Another storage subsystem 508 may include a storage controller 510 and native volumes 512 and 514. The native volumes in each storage subsystem 500 and 508 are known to their respective storage subsystem and may generally be online, operable and available for storage and retrieval of information. By contrast, exported storage volume 520 was at some point exported by storage subsystem 500 in accord with features of the present invention. Exported volume 520 is therefore available for importation or reinsertion. As shown in FIG. 5 exported volume 520 may be imported into storage subsystem 508 and thereby migrated in between storage subsystem 500 and storage subsystem 508. In addition, exported volume 520 may be reinserted into storage subsystem 500 from whence it was exported. Such removal and reinsertion of the storage volume may be useful, as noted above, for physical security of a storage volume in high security applications.

Returning again to FIG. 1, exported volume 103 is marked such that it is recognized as "foreign" with respect to any storage subsystem into which it may be inserted. By so marking the exported volume as foreign as disclosed in the sibling patent application, insertion of the exported volume into any storage subsystem will evoke an orderly, consistent response allowing the user to determine whether and how to import the foreign volume. Native volume 105 comprises a storage space known to storage subsystem 100. Such a native volume may be available for use by host systems 104 if and when enabled as online by storage management features of storage subsystem 100.

In accordance with features and aspects of the present invention, any volume inserted into storage subsystem 100 initiates a pre-merge operation to commence the importation process More specifically, as discussed above, each disk drive of a volume group includes configuration information stored in a designated area of the disk drive. This configuration area is often subdivided into a volume database area and an other information area. As noted above, the "other" information area evolved as storage systems evolved to include information regarding the storage system not unique to a particular volume. Hence, the "other" information area is resident on all drives in a storage system. In accordance with an aspect of the invention, volume and volume group information associated with a storage system may preferably be stored on all disk drives of the system. Whereas previous techniques stored volume information regarding only certain volumes in the volume database area, the volume and volume group information stored in the "other" information area relates to all volumes in the volume group that includes the disk drive. In this manner, insertion of any drive of the volume group makes available to the system information regarding all volumes of the volume group.

FIG. 4 is a block diagram depicting a typical disk drive 400 of a storage system having a portion of its storage allocated to system and user data 404 and another portion relating to configuration information 402. The configuration database 402 may be further subdivided into a standard volume area 406 and an "other" information area 408. As above, the standard volume area 406, as presently practiced, includes information only about volumes with which this particular drive is associated. In accordance with an aspect of the present invention, the "other" information area may include volume and volume group information for all volumes of the volume group with which the drive is associated. Those of ordinary skill in the art will recognize that the configuration database 402 represents a minute fraction of the storage capacity of drive 400. Further, the configuration database 402 may be located anywhere within the associated drive 402.

As noted herein and discussed in further detail below, inclusion of all volume information of the volume group on each disk drive of the volume group allows the storage system to present information to a user in advance of insertion of all drives of the volume group. The information so presented may inform the user of all possible volumes of the volume group being inserted. So informed, the user may more rapidly elect to import volumes of the volume group following insertion of the last disk drive of the volume group. This preliminary presentation of the volume information to a user in advance of availability for importation is referred to herein as a "pre-merge" operation. Once the last drive of a volume group is inserted into the system, any of the volumes of the volume group may be imported by the user. The pre-merge operation initiated by insertion of the first drive of a new volume group provides all required information for the user to determine which volumes will be available and hence which volumes may be desired for importation into the storage system.

FIGS. 2 and 3 are flowcharts describing methods associated with aspects of the present invention and operable in a storage system to detect insertion of disk drives of a volume group and to process information residing on such inserted drives. In particular, element 200 of FIG. 2 is operable in response to sensing insertion of a disk drive into a storage subsystem. Techniques and circuits associated with sensing such an event are well-known to those of ordinary skill in the art. Typically, insertion of such a disk drive into a storage subsystem generates a signal and/or corresponding message on communication media and protocols associated with the disk drive. The signal or message is communicated to a storage controller where the message may be processed by methods such as that of FIG. 2. Such sensing may utilize processor interrupt features or other well-known programming techniques to initiate processing of element 200. Element 200 may then translate the detected signal into an event message. The event message generated by element 200 may then be received by other elements of the storage controller for further processing by storage management techniques within the storage subsystem.

FIG. 3 describes a process responsive to receipt of such an event indicating drive insertion. In particular, element 300 is operable to await receipt of such a signaled event as described above with respect to FIG. 2. Upon receipt of such an event, element 302 is then operable to read configuration information from the newly inserted drive. In particular, as discussed above, element 302 may read the "other" configuration area from the inserted disk drive. The "other" configuration information area on the disk drive may preferably include configuration information regarding all volumes within the volume group in which the inserted disk drive is a member. As noted above with respect to FIG. 4, the "other" configuration information area may reside anywhere within the storage capacity of the inserted disk drive as a matter of design choice. Further, the configuration information may be subdivided so as to include areas of configuration information in addition to the "other" configuration information area read by element 302. Any number of such configuration areas may be resident on the disk drive. Still further, configuration information may be duplicated in multiple areas of the disk to provide for redundant storage of the configuration information.

Using the "other" configuration information read from the newly inserted drive, element 304 is next operable to identify all disk drives and volumes associated with the volume group in which the newly inserted disk drive is a member. As noted above, in one aspect of the present invention, every disk drive in the storage subsystem includes such configuration information regarding all volumes in the volume group associated with each disk drive. Element 308 is operable to perform a pre-merge operation. As discussed further herein below, the pre-merge operation generally presents information to a user of the storage subsystem indicating all volumes associated with the volume group being inserted. Though shown as performed upon insertion of each disk drive of the volume group, each disk drive should have the same volume and volume group information stored in its configuration information area. Repeating the pre-merge operation of element 308 on each drive insertion merely suggests verification of and/or display of the same data retrieved from each disk drive. The pre-merge volume information so presented allows a user to consider what volumes may soon be available for importation and to determine which of those volumes may be relevant to the particular user's application.

Element 310 is next operable to determine whether the newly inserted drive is the last disk drive of the associated volume group. If not, processing of the method is complete until a next drive insertion event is signaled. If element 310 determines that the newly inserted drive is the last disk drive of the associated volume group, element 312 is then operable to enable the user to import any of the volumes identified by the pre-merge operations and associated with the volume group. As noted above, the user is generally not permitted to request importation of a storage volume until all disk drives of the volume have been successfully inserted into the storage subsystem. Importation of volumes presented to the user by operation of element 308 may therefore be disabled until the last disk drive of the volume group is inserted. Alternatively, processing of element 312 may selectively enable importation of particular volumes of the associated volume group when all disk drives required for each particular volume are successfully inserted. Such design options are well-known to those of ordinary skill in the art.

FIG. 6 is a flowchart describing additional details of the pre-merge operation described above with respect to element 308. As noted above, a merge operation is performed when the user requests importation of an identified a volume. The merge operation integrates volume definition information for an imported volume with existing configuration information relating to native volumes already known to the storage subsystem. The pre-merge operation in accordance with an aspect of the present invention provides information to the user in advance of allowing such merge operations. Element 600 is first operable to present volume information for all volumes in the volume group associated with the newly inserted drive. Element 602 is then operable to determine if importation of the newly identified volumes has been enabled. As indicated above, importation of newly identified volumes may be enabled when the last disk drive of a volume or the volume group is inserted. If importation is not enabled, processing continues as discussed above with respect to FIG. 3. If volume importation of the newly inserted volumes has been enabled, element 604 next determines if the user is requesting importation of the identified volumes. A user may indicate a volume request by any of several well-known user interface techniques including, for example, keyboard input, pointer device input, voice recognition input or any other means of user input. Further, those ordinary skill in the art will recognize that such a user interface techniques may be performed by higher level host interactions in response to messages exchanged between the storage subsystem and an associated host system application for providing user interaction. Such design choices are well-known to those of ordinary skill in the art. If element 604 determines that the user has requested the importation of one or more identified volumes associated with the newly inserted a volume group, element 606 is operable to perform merge processing to import the identified volumes of the volume group. As noted above, merge processing associated with importation of a volume into a storage subsystem involves integrating volume information regarding the newly imported volume with data associated with presently known native volumes in the storage subsystem. Following such a merge operation, the identified volumes may be available for use to store or retrieve user or system supply data.

Those of ordinary skill in the art will readily recognize numerous equivalent programming techniques for communications between programmable components within the storage system. Use of events as messages between cooperating processing elements is but one exemplary design choice known to those of ordinary skill in the art. In particular, such event processing may be implemented by cooperating processing elements in that elements may be registered to await detection of an event. Often such registered processes may be referred to as registered clients or registered client processes. Still further, such registered clients are often referred to as listeners or listening clients in that the processing of that client is paused as it "listens" for detection of the corresponding registered event. Such programming models and paradigms are representative of one exemplary design choice known to those of ordinary skill in the art.

Further, those of ordinary skill in the art will recognize that such programmable elements may include software components operable within general or special-purpose processors of the storage controller as well as standard or customized electronic circuits for such event notification and processing. Implementation of such programmed features in software, firmware or electronic circuits are common design choices known to those of ordinary skill in the art.

While the invention has been illustrated and described in the drawings and foregoing description, such illustration and description is to be considered as exemplary and not restrictive in character. One or more exemplary embodiments of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for storage management comprising:
    detecting insertion of an inserted disk drive of a volume group in an array storage subsystem wherein the volume group includes one or more volumes each including one or more disk drives wherein the volume group includes at least one volume having two or more disk drives;
    reading all configuration information from a configuration information area on the inserted disk drive wherein the configuration information includes information regarding all volumes in the volume group;
    performing a pre-merge operation to present the configuration information to a user wherein the pre-merge operation is performed in advance of detecting insertion of a last inserted disk drive of all disk drives of all volumes of the volume group; and
    allowing importation of volumes identified in the configuration information only in response to detecting insertion of the last inserted disk drive.

2. The method of claim 1 wherein the step of reading includes:
    reading configuration information regarding a volume group associated with the inserted disk drive;
    reading configuration information regarding volumes associated with the volume group; and
    reading configuration information regarding pseudo volumes,
    wherein all configuration information is read as an atomic operation.

3. The method of claim 1 further comprising:
    receiving input from a user requesting import of one or more volumes identified in the configuration information; and
    importing the identified volumes into the array storage system.

4. The method of claim 3 wherein the step of importing includes:
    merging the configuration information with other configuration information previously known to the array storage system.

5. The method of claim 1 further comprising:
    registering a listener client process to await receipt of an event indicating the detection of insertion of a disk drive; and
    signaling a disk insertion event to all registered listener client processes in response to the detection of insertion of a disk drive.

6. A method for storage management comprising:
    detecting insertion of an inserted disk drive in the array storage system;
    reading all configuration information from the inserted disk drive wherein the configuration information includes information regarding a volume group that comprises one or more volumes each including one or more disk drives one of which is the inserted disk drive, wherein at least one volume of the volume group includes two or more disk drives; and
    performing a pre-merge operation to present the configuration information regarding all volumes identified in the configuration information to a user of the array storage system wherein the pre-merge operation is performed prior to allowing importation of any volumes of the volume group and wherein the pre-merge operation is performed prior to detecting insertion of a last inserted disk drive of all disk drives of all volumes of the volume group.

7. The method of claim 6 further comprising:
    detecting insertion of the last inserted disk drive; and
    allowing a user to import volumes of the volume group identified in the configuration information only in response to detecting insertion of the last inserted disk drive.

8. The method of claim 6 further comprising:
providing storage management control as multiple hierarchical layers of control,
wherein a first layer of the storage management control receives notification of detection of the disk drive insertion and wherein the step of performing a pre-merge includes:
notifying higher layers of the storage management control of the detected disk drive insertion; and
reading of other configuration data from the inserted disk drive by at least one layer of the storage management control.

9. The method of claim 8 wherein the step of performing a pre-merge further includes:
detecting within a layer of the storage management control that the inserted disk drive is the last inserted disk drive; and
allowing a user to enter a merge request to import identified volumes of the volume group identified in the other configuration data.

10. The method of claim 9 further comprising:
merging the other configuration data associated with the identified volumes with other configuration data for other volumes known to the storage management control.

11. A system for storage management comprising:
means for detecting insertion of an inserted disk drive of a volume group in an array storage subsystem wherein the volume group includes one or more volumes each including one or more disk drives wherein the volume group includes at least one volume having two or more disk drives;
means for reading all configuration information from a configuration information area on the inserted disk drive wherein the configuration information includes information regarding all volumes in the volume group;
means for performing a pre-merge operation to present the configuration information to a user wherein the pre-merge operation is performed in advance of detecting insertion of a last inserted disk drive of all disk drives of all volumes of the volume group; and
means for allowing importation of volumes identified in the configuration information only in response to detecting insertion of the last inserted disk drive.

12. The system of claim 11 wherein the means for reading includes:
means for reading configuration information regarding a volume group associated with the inserted disk drive;
means for reading configuration information regarding volumes associated with the volume group; and
means for reading configuration information regarding pseudo volumes,
wherein all configuration information is read as an atomic operation.

13. The system of claim 11 further comprising:
means for receiving input from a user requesting import of one or more volumes identified in the configuration information; and
means for importing the identified volumes into the array storage system.

14. The system of claim 13 wherein the means for importing includes:
means for merging the configuration information with other configuration information previously known to the array storage system.

15. The system of claim 11 further comprising:
means for registering a listener client process to await receipt of an event indicating the detection of insertion of a disk drive; and
means for signaling a disk insertion event to all registered listener client processes in response to the detection of insertion of a disk drive.

16. A computer readable storage medium tangibly embodying program instructions for a method for storage management, the method comprising:
detecting insertion of an inserted disk drive of a volume group in an array storage subsystem wherein the volume group includes one or more volumes each including one or more disk drives one of which is the inserted disk drive,
wherein at least one volume of the volume group includes two or more disk drives;
reading all configuration information from a configuration information area on the inserted disk drive wherein the configuration information includes information regarding the volume group;
performing a pre-merge operation to present information regarding all volumes identified in the configuration information to a user wherein the pre-merge operation is performed prior to detecting insertion of a last inserted disk drive of all disk drives of all volumes of the volume group; and
allowing importation of volumes identified in the configuration information only in response to detecting insertion of the last inserted disk drive.

17. The medium of claim 16 wherein the method step of reading includes:
reading configuration information regarding a volume group associated with the inserted disk drive;
reading configuration information regarding volumes associated with the volume group; and
reading configuration information regarding pseudo volumes,
wherein all configuration information is read as an atomic operation.

18. The medium of claim 16 wherein the method further comprises:
receiving input from a user requesting import of one or more volumes identified in the configuration information; and
importing the identified volumes into the array storage system.

19. The method of claim 18 wherein the method step of importing includes:
merging the configuration information with other configuration information previously known to the array storage system.

20. The medium of claim 16 wherein the method further comprises:
registering a listener client process to await receipt of an event indicating the detection of insertion of a disk drive; and
signaling a disk insertion event to all registered listener client processes in response to the detection of insertion of a disk drive.

* * * * *